H. S. NELSON

Sept. 9, 1930. PHONOGRAPH REPRODUCER Re. 17,796

Original Filed April 9, 1926

WITNESSES

Isaac H. Shumell.

Frank Mosley.

INVENTOR

Helen S. Nelson

Reissued Sept. 9, 1930

Re. 17,796

UNITED STATES PATENT OFFICE

HEBER S. NELSON, OF SALT LAKE CITY, UTAH, ASSIGNOR OF ONE-FOURTH TO ROBERT MURRAY STEWART, OF SALT LAKE CITY, UTAH

PHONOGRAPH REPRODUCER

Original No. 1,649,483, dated November 15, 1927, Serial No. 100,961, filed April 9, 1926. Application for reissue filed November 9, 1928. Serial No. 319,144.

My invention relates to an electromagnetic phonograph reproducer.

The object of my invention is to provide a simple and efficient means of converting mechanical vibrations, such as are grooved or engraved on phonograph records, into electrical impulses; these impulses when introduced into an amplifier circuit connected to what is commonly called a loud speaker, reproduce the music, voice, or whatever sounds are recorded, thus providing an instrument for such purposes which will be extremely sensitive to actuating vibratory changes.

Another object is to provide a spool for the coil of wire, which will not permit eddy currents of the transformer type.

Another object of the invention is to use a single spool or winding and yet obtain the combined magnetic action of four pole pieces on the vibrating armature.

Another object is to provide a means of centering, balancing and adjusting the armature to the most sensitive position, so as to prevent the armature from sticking to the pole pieces and to produce through the amplifier with loudness and distinctness, without distortion, such sounds as may be incised on the surface of a phonograph record.

With the foregoing and other objects in view, the invention consists of certain novel features of construction, combination and arrangement of parts, as will be more fully described and particularly pointed out in the appended claims.

Figure 1:
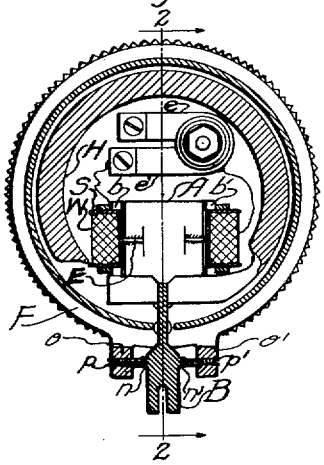
Figure 2:
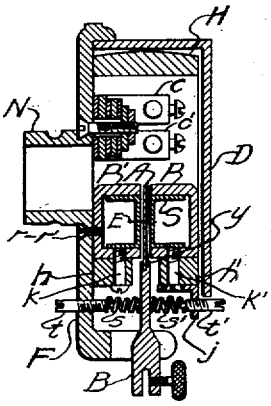
Figure 5:
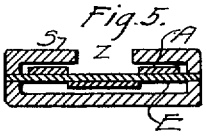
Figure 5A:
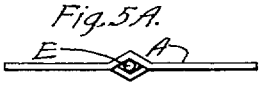
Figure 3:
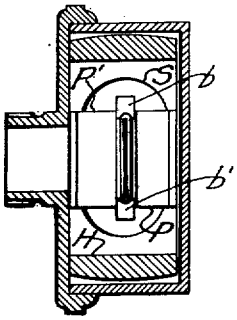
Figure 4:
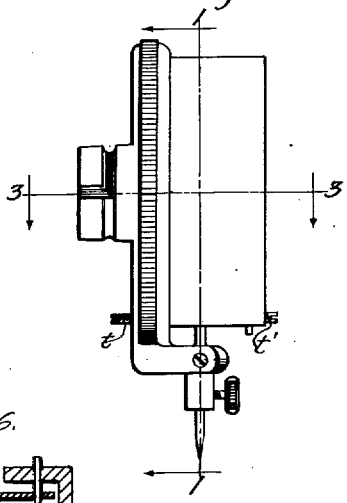
Figure 6:
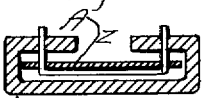

Fig. 4 is a side elevation of an electromagnetic pick-up constructed in accordance with my invention. Fig. 1 is a transverse section of the same, on the line 1 1 Fig. 4 and looking in the same direction indicated by the arrows on said line. Fig. 2 is a longitudinal section of the same, through the center of the armature and the stylus bar, on the line of 2 2 of Fig. 1 and looking in the direction indicated by the arrows on said line. Fig. 3 is a cross sectional view of the same, through the center, on the line 3 3 Fig. 4 and looking in the direction indicated by the arrows thereon; Fig. 5 is an enlarged cross sectional view showing the method of pivoting the armature; Fig. 5[a] is a side elevation of the armature and shaft. Fig. 6 is an enlarged cross sectional view showing a modified means of pivoting the armature.

In said drawings H designates a permanent magnet of circular form, to its extremities or poles *h* and *h'* are secured the U-shaped pole pieces P and P' by means of screws *k k'*; these pole pieces support the spool S, on which is wound the wire forming the coil of wire, the number of turns of wire being dependent upon the impedance of the circuit in which the pickup is to be used. This spool consists of a non-magnetic oblong tube with oval end pieces; the tube is slotted at *z*, Fig. 5, upon its upper side and its ends separated so as to prevent eddy currents from affecting the magnetization of the armature A. This spool is held in place by blocks *b* and *b'*, which are secured to the spool at each end and fit into recesses cut into the pole pieces P and P' at each of their four corners. The said armature is supported by means of a shaft E, which shaft is supported at its ends by being run through apertures in the walls of the tube. The armature has spaced longitudinally extending slots stamped into it across its transverse center line to admit shaft E. One end of the armature is connected to the stylus bar B. The stylus bar is slotted at *y* to receive the armature. The stylus bar is pivoted by means of screws *p p'*, Fig. 1, engaging in lugs *n n'*. These screws *p p'* are supported by the lugs *o o'* from the frame F. This frame is of non-magnetic material. The pole piece P' is secured to it by screws *r r'*, which hold the entire unit in the case. The screw *t* is also tapped into the frame. The screws *t t'* are for the purpose of adjusting the tension of the springs *s s'* which center and balance the armature in its most sensitive position. The screws *t t'* and the stylus bar are provided with short lugs over which the springs *s s'* are placed to keep them from moving out of alignment. The ends of the wire from the spool S are soldered to the posts, *c c'*. These posts are provided with suitable set screws for connecting wires to the amplifier. They are also suitably insulated from each other and from the frame. A non-magnetic cover D is provided to protect the various working parts.

The operation of the electromagnetic pick-up is as follows: The stylus bar B is caused to vibrate by the needle following the groove engraved in the record. The stylus bar vibrates the armature, thus causing first one end and then the other to approach a pole-piece of given polarity; as one of said ends draws near to a polepiece that is north a magnetic south pole is induced in said end and a north pole is induced in the opposite end, then as the said end vibrates the other way it approaches a south polepiece and by induction the polarity of end is changed to north. These changes in the magnetic field result in the induction of a rapidly alternating curent in the coil, and this current is transmitted to the amplifier where it is reinforced and strengthened until it is able to impart sufficient vibration to a diaphragm to produce audible sounds. Inasmuch as there is no vibrating mechanical connection between the reproducing diaphragm and the stylus no scratch or other sounds due solely to the friction between the stylus and the record can be reproduced and consequently the rendition of the record is much superior to that wherein no electric reproduction is employed.

It is obvious that the instrument may be used as a recorder, for the reason that the coil is connected to the output of a recording circuit and when a current or electrical impulse is sent through the coil W, it magnetizes the armature A. It follows that in the passage of an undulating current through the coil, the armature will be attracted with a force equal to the repulsion and attraction of all four poles, and that the vibratory motion thus produced will be transmitted through the stylus bar to the needle or engraving tool.

I claim:

1. An electromagnetic reproducing device, comprising a permanent magnet, two polepieces attached thereto, a non-magnetic spool, a coil on said spool having impedance suitable to the circuit in which it is to be used, a centrally pivoted armature operating between the four limbs of the polepieces, a stylus bar, and flexible means to connect said armature to said stylus bar.

2. In an electromagnetic reproducer, means to produce a magnetic field, a coil mounted in said field, an armature pivotally mounted in said coil, a pivotally mounted stylus bar to which said armature is resiliently connected, and resilient adjusting means bearing against said stylus bar.

3. In an electromagnetic reproducer, means to produce a magnetic field, a coil in said field, a spool in said coil, a freely rockable pivot mounted in said spool, an armature carried by said pivot, a pivotally mounted stylus bar resiliently connected to said armature, and resilient adjusting means bearing against said stylus bar.

4. In an electromagnetic reproducing device, means to produce a magnetic field, a coil disposed in said field, an armature pivotally mounted in said coil, a pivotally mounted stylus bar, and a flexible connection between said armature and said bar.

5. An electromagnetic reproducing device, comprising a body ring, a magnet mounted therein, two U-shaped polepieces attached to said magnet, a coil of wire wound to an impedance suitable to the circuit in which the device is to be used, a non-magnetic slotted tube in said coil, a shaft supported in the walls of said tube, an armature mounted on said shaft so as to be centered between said polepieces, a stylus bar connected to said armature, and adjustable means bearing on said bar to keep said armature properly positioned in said coil.

6. An electromagnetic reproducing device, comprising an adjustable stylus bar, an armature attached to said bar, a shaft disposed substantially along the transverse center line of said armature and secured to said armature, a spool, holes in the walls of said spool in which the ends of said shaft are mounted, a coil on said spool, a magnet, two U-shaped polepieces attached to said magnet and disposed with their limbs adjacent the ends of said armature, a body ring on which the afore-mentioned parts are mounted in assembly, and an enclosing casing member.

7. An electromagnetic reproducing device, comprising a body ring, spaced ears projecting therefrom, a stylus bar, pivot members for said bar passing through said ears, adjusting means for said stylus bar extending substantially at right angles to said pivot members, an armature flexibly connected to said bar, pivot means for said armature lying substantially along the transverse center line thereof and secured thereto, a nonmagnetic spool, holes in the walls of said spool in which the ends of said pivot are mounted, a coil on said spool, a magnet, U-shaped polepieces energized by said magnet and disposed to act on said armature, and an enclosing casing member.

HEBER S. NELSON.